Sept. 2, 1952

J. MURRILL 2,609,211

SAFETY LOCK FOR TRAILERS

Filed Aug. 7, 1950

James Murrill
INVENTOR.

BY Clarence A. O'Brien
and Harvey B. Jackson
Attorneys

Patented Sept. 2, 1952

2,609,211

UNITED STATES PATENT OFFICE 2,609,211

SAFETY LOCK FOR TRAILERS

James Murrill, San Francisco, Calif.

Application August 7, 1950, Serial No. 178,083

4 Claims. (Cl. 280—33.05)

This invention relates to new and useful improvements in coupling devices between tractors and trailers, and the primary object of the present invention is to provide an automatic lock for full automatic trailers so that retraction of the fifth wheel pin of a tractor from a trailer will be prevented until a manual force is employed for moving the lock to a position where it may be released.

Another important object of the present invention is to provide a safety lock for trailers including a crank portion supporting a hinge so that when the crank portion is raised to a vertical position a fifth wheel pin being moved to its coupling position will engage the hinge to effect a lowering of the crank portion to a position for blocking retraction of the pin, whereas movement of the pin from its coupling position with the crank portion raised will cause swinging of the hinge sufficient to permit the pin to clear the hinge without lowering the crank portion.

A further object of the present invention is to provide a safety lock for the fifth wheel pin of a tractor that is quickly and readily applied to or removed from a trailer in a convenient manner and which is automatically moved to a position for blocking retraction of a fifth wheel pin as the pin is moved to its coupling position.

A still further aim of the present invention is to provide a locking device of the aforementioned character that is simple and practical in construction, strong and reliable in use, small and compact in structure, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
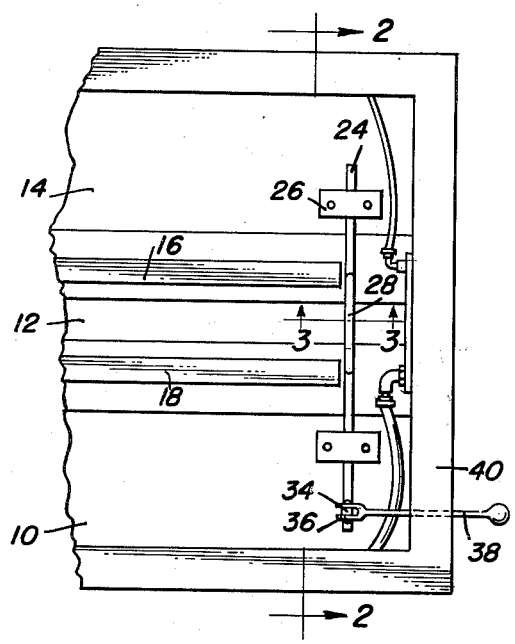
Figure 1 is a fragmentary plan view of the forward end of a trailer and showing the present invention mounted thereon.

Referring now to the drawings in detail, wherein, for the purpose of illustration, there is disclosed a preferred embodiment of the present invention, the numeral 10 represents a full automatic trailer of well-known construction having an elongated slot 12 in its lower wall 14 and a pair of elongated guides 16 and 18 paralleling the slot 12 and adapted to slidably receive the head portion 20 of a fifth wheel pin 22.

At the forward ends of the guides 16 and 18 there is mounted an elongated shaft 24 that extends transversely of the guides. The ends of the shaft 24 are rotatably supported in bearings 26 secured to the bottom wall 14. The shaft 24 is provided with a central crank portion 28 located between the guides and at the forward ends of the guides. Rear swinging movement of the crank portion 28 is prevented, since the crank portion will engage the forward ends of the guides.

A hinge 30 is secured by welding or the like to the web of the crank portion 28 and includes a lower end portion 32 that extends below the axis of the shaft 24 when the crank portion is raised to a vertical position, to be engaged by the head portion 20 of the pin 22.

Figure 3:
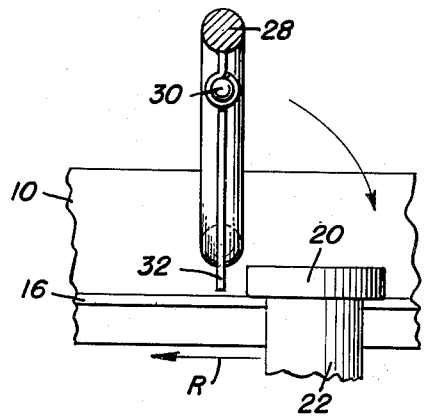
Figure 3 is an enlarged vertical sectional view taken substantially on the plane of section line 3—3 of Figure 1 and showing a fifth wheel pin being moved to its coupling position.
Figure 2:
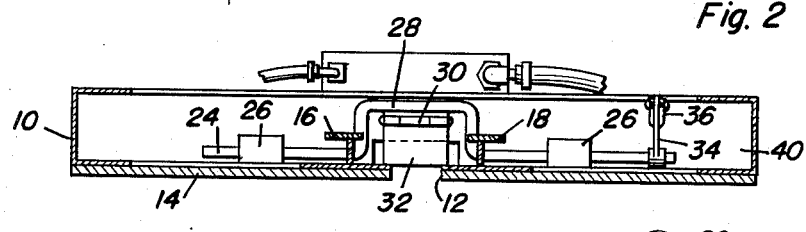
Figure 2 is a transverse vertical sectional view taken substantially on the plane of section line 2—2 of Figure 1.
Figure 4:
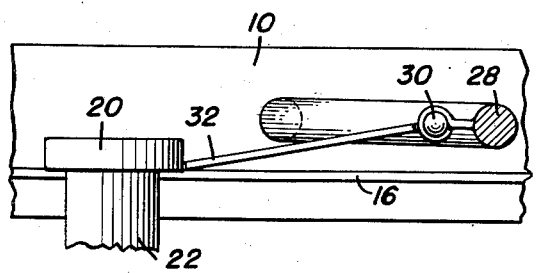
Figure 4 is a view similar to Figure 3 and showing the invention in its locked position blocking retraction of the fifth wheel pin.

In practical use of the present invention, the crank portion 28 is raised to position the hinge 30 vertically as shown in Figure 3. As the fifth wheel pin 22 is moved rearwardly on the guides 16 and 18, as shown by arrow R in Figure 3, the head 20 engages the lower end portion 32 of the hinge 30, and since the hinge cannot swing rearwardly, the shaft 24 and crank portion 28 will rotate in a clockwise direction sufficiently for the weight of the crank portion 28 to cause the crank portion to swing to a horizontal position as shown in Figure 4, where retraction of the pin is prevented, it being noted that the hinge 30 is wider than the slot 12 to prevent the hinge from passing through the slot.

Figure 5:
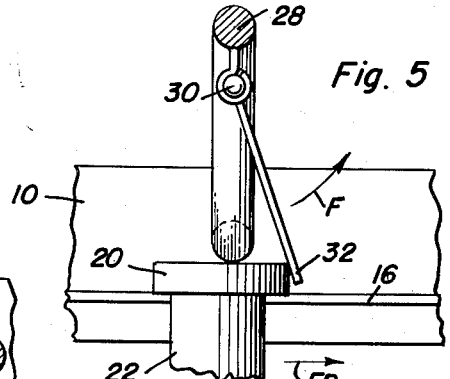
Figure 5 is a view similar to Figure 3 and showing the fifth wheel pin being moved to its uncoupled position and swinging the hinge forwardly without moving the crank portion.

When the crank portion 28 is again raised to a vertical position, as shown in Figure 5, a forward movement of the pin 22, indicated by arrow FP, will cause the head 20 of the pin 22 to engage the lower end 32 of the hinge and swing the hinge forwardly in the direction of arrow F, thereby permitting retraction of the pin without effecting a lowering of the crank portion.

Means is provided for raising the crank portion 28 to its vertical position. This means consists of an arm 34 secured to and projecting laterally from the shaft 24. The arm 34 is so arranged on the shaft 24 that it will be raised to a vertical position when the crank portion 28 is raised to a vertical position. The bifurcated end 36 of a handle 38 is pivoted to the arm 34 and the handle 38 is slidably mounted in a vertical slot in the rear wall 40 of the trailer. As the handle 38 is manually forced forwardly, the arm 34 will be raised and the shaft 24 and crank portion 28 rotated counter-clockwise to raise the crank portion 28.

Having described the invention, what is claimed as new is:

1. For use with a vehicle having a bed and a pair of guides on the bed for slidably receiving a fifth wheel pin, a safety lock for the pin comprising a horizontally disposed shaft rotatably supported on the bed and extending transversely of said guides at the front ends thereof, a vertically swingable member carried by and rotatable with said shaft, and a hinge attached to said member and extending below the shaft to be engaged by the fifth wheel pin as the pin is moved rearwardly in the guides, said pin engaging the hinge to swing the member forwardly behind the pin to prevent accidental retraction of the pin.

2. For use with a trailer having a bed and a pair of guides on the bed for slidably receiving a fifth wheel pin, a safety lock for the pin comprising a horizontal shaft extending transversely of said guides and having a crank portion positioned at the front ends of said guides, bearings on the bed rotatably supporting the shaft, and a hinge attached to said crank portion, said hinge being located between said guides and including an end projecting below the axis of said shaft when the crank portion is raised to a substantially vertical position, the said end of said hinge adapted to be engaged by said pin sliding on said guides to rotate the shaft and effect a lowering of the crank portion as the pin is moved rearwardly and said hinge adapted to swing forwardly independently of the crank portion and shaft when the crank portion is raised and the pin moved forwardly past the hinge.

3. The combination of claim 2 and a handle attached to said shaft for rotating the shaft to raise the crank portion.

4. For use with a trailer having a pair of longitudinal guides for slidably receiving the fifth wheel pin of a tractor, a device for preventing uncoupling of the trailer and tractor comprising an elongated horizontal shaft extending transversely of the guides at the front ends thereof and having a central crank portion located between the guides, bearings mounted on the trailer rotatably supporting the shaft, and a hinge attached to the crank portion and positioned between the guides, said hinge being swingable forwardly independently of the crank portion, and said hinge including a lower end extending below the axis of the shaft to be engaged by the fifth wheel pin of a tractor to impart swinging to the crank portion whereby the crank portion will engage in front of a fifth wheel pin when the crank portion is disposed vertically, said hinge swinging forwardly to permit a pin to clear the hinge when the tractor and trailer are being uncoupled with the crank portion raised.

JAMES MURRILL.

REFERENCES CITED

The following references are of record in the file of this patent:

UNITED STATES PATENTS

| Number | Name | Date |
| --- | --- | --- |
| 1,998,001 | Edwards | Apr. 16, 1935 |
| 2,212,708 | Fraser | Aug. 27, 1940 |

FOREIGN PATENTS

| Number | Country | Date |
| --- | --- | --- |
| 22,867 | Great Britain | May 1, 1913 |
| 421,210 | Great Britain | Dec. 17, 1934 |